US010866161B2

(12) United States Patent
Suzuki et al.

(10) Patent No.: US 10,866,161 B2
(45) Date of Patent: Dec. 15, 2020

(54) ROAD SURFACE CONDITION ESTIMATION APPARATUS

(71) Applicants: DENSO CORPORATION, Kariya (JP); SOKEN, INC., Nisshin (JP)

(72) Inventors: Yoichiro Suzuki, Nisshin (JP); Takatoshi Sekizawa, Kariya (JP)

(73) Assignees: DENSO CORPORATION, Kariya (JP); SOKEN, INC., Kariya (JP)

(*) Notice: Subject to any disclaimer, the term of this patent is extended or adjusted under 35 U.S.C. 154(b) by 183 days.

(21) Appl. No.: 16/224,525

(22) Filed: Dec. 18, 2018

(65) Prior Publication Data

US 2019/0120721 A1 Apr. 25, 2019

Related U.S. Application Data

(63) Continuation of application No. PCT/JP2017/017874, filed on May 11, 2017.

(30) Foreign Application Priority Data

Jun. 22, 2016 (JP) .................................. 2016-123899

(51) Int. Cl.
*B60C 19/00* (2006.01)
*B60C 23/04* (2006.01)
(Continued)

(52) U.S. Cl.
CPC ......... *G01M 17/025* (2013.01); *B60C 11/246* (2013.01); *B60C 19/00* (2013.01);
(Continued)

(58) Field of Classification Search
None
See application file for complete search history.

(56) References Cited

U.S. PATENT DOCUMENTS 6,640,623 B2 * 11/2003 Ono ..................... B60T 8/172
73/146
8,122,762 B2 * 2/2012 Wakao ................ B60T 8/1725
73/146

(Continued)

FOREIGN PATENT DOCUMENTS

JP   H11034828 A   2/1999
JP   H11048938 A   2/1999
(Continued)

*Primary Examiner* — Natalie Huls
*Assistant Examiner* — Jermaine L Jenkins
(74) *Attorney, Agent, or Firm* — Harness, Dickey & Pierce, P.L.C.

(57) ABSTRACT

A road surface condition estimation apparatus may output a detection signal corresponding to a magnitude of a vibration of a tire. The road surface condition estimation apparatus may calculate a level of high frequency component of the detection signal in a contact section. The road surface condition estimation apparatus may transmit a calculation result of the level of high frequency component as road surface condition data each time the tire rotates for a predetermined number of times. The road surface condition estimation apparatus may estimate a condition of road surface based on the road surface condition data. The road surface condition estimation apparatus may stop transmitting the road surface condition data when estimating that the vehicle accelerates or decelerates.

8 Claims, 8 Drawing Sheets

(51) Int. Cl.
  *B60T 8/172* (2006.01)
  *G07C 5/02* (2006.01)
  *G07C 5/08* (2006.01)
  *G01M 17/02* (2006.01)
  *B60C 11/24* (2006.01)
  *B60W 40/068* (2012.01)
  *B60C 23/06* (2006.01)

(52) U.S. Cl.
  CPC .............. *B60C 23/04* (2013.01); *B60T 8/172* (2013.01); *G07C 5/02* (2013.01); *G07C 5/08* (2013.01); *B60C 23/0488* (2013.01); *B60C 23/06* (2013.01); *B60C 2019/004* (2013.01); *B60T 2210/12* (2013.01); *B60T 2210/14* (2013.01); *B60W 40/068* (2013.01)

(56) References Cited

U.S. PATENT DOCUMENTS

| | | | |
|---|---|---|---|
| 9,045,117 B2* | 6/2015 | Wakao | B60W 40/06 |
| 9,046,457 B2* | 6/2015 | Hanatsuka | B60G 17/0165 |
| 10,059,316 B2* | 8/2018 | Hanatsuka | B60C 19/00 |
| 10,377,385 B2* | 8/2019 | Hanatsuka | B60W 40/06 |
| 2016/0368501 A1 | 12/2016 | Suzuki et al. | |
| 2017/0057306 A1 | 3/2017 | Suzuki et al. | |

FOREIGN PATENT DOCUMENTS

| | | |
|---|---|---|
| JP | H11334555 A | 12/1999 |
| JP | 2009056818 A | 3/2009 |
| JP | 2012051429 A | 3/2012 |
| JP | 2015174636 A | 10/2015 |
| JP | 2015174637 A | 10/2015 |
| JP | 2015217713 A | 12/2015 |

* cited by examiner

US 10,866,161 B2

ROAD SURFACE CONDITION ESTIMATION APPARATUS

CROSS REFERENCE TO RELATED APPLICATIONS

The present application is a continuation application of International Patent Application No. PCT/JP2017/017874 filed on May 11, 2017, which designated the United States and claims the benefit of priority from Japanese Patent Application No. 2016-123899 filed on Jun. 22, 2016. The entire disclosures of all of the above applications are incorporated herein by reference.

TECHNICAL FIELD

The present disclosure relates to a road surface condition estimation apparatus that estimates a road surface condition based on a vibration received by a tire.

BACKGROUND

A road surface condition estimation apparatus includes a tire side device attached to the back side of a tire. The tire side device detects a vibration received by the tire and transmits a detection result of the vibration to a vehicle side device, so that the road surface condition estimation apparatus estimates a road surface condition.

SUMMARY

A road surface condition estimation apparatus may calculate a level of high frequency component of a detection signal in a contact section. The road surface condition estimation apparatus may transmit a calculation result of the level of high frequency component as road surface condition data each time the tire rotates for a predetermined number of times. The road surface condition estimation apparatus may estimate a condition of road surface based on the road surface condition data. The road surface condition estimation apparatus may stop transmitting the road surface condition data when estimating that the vehicle accelerates or decelerates.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Figure 1:
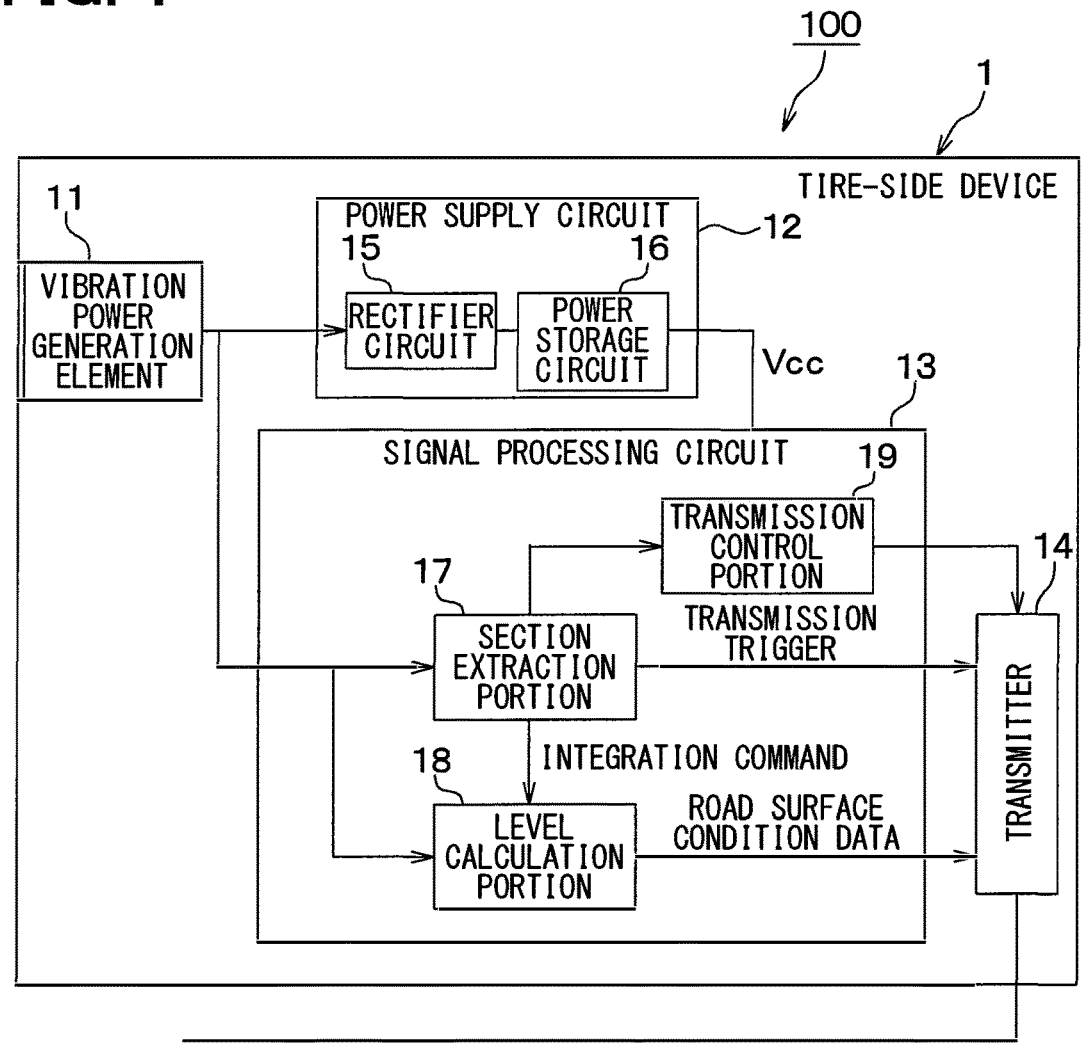
FIG. 1 is a diagram showing an entire block configuration of a road surface condition estimation apparatus according to a first embodiment.
Figure 1:
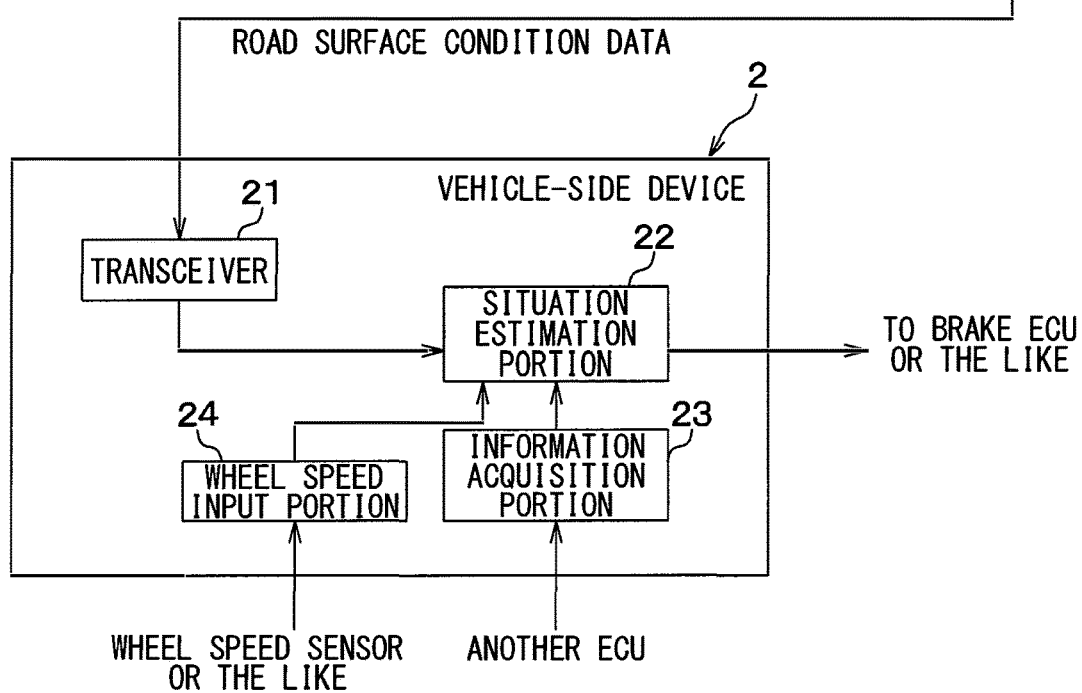

For example, a road surface condition estimation apparatus includes a tire side device attached to the back side of a tire tread. The tire side device detects a vibration received by a tire, and transmits a detection result of the vibration to the vehicle side device. With this configuration, the road surface condition estimation apparatus estimates a road surface condition. In the road surface condition estimation apparatus, while a section of the tire tread corresponding to a part of the tire to which a vibration power generation element is attached contacts the road surface during tire rotation, a level of a high frequency component in a detection signal of the vibration power generation element is changed. A contact section is defined that the section of the tire tread corresponding to the part of the tire to which the vibration power generation element is attached contacts the road surface. In this case, the level of the high frequency component of the detection signal of the vibration power generation element corresponding to the contact section is employed as road surface condition data. Each time the tire makes one rotation, the tire side device transmits the road surface condition data to the vehicle side device, and the vehicle side device estimates the road surface condition based on the road surface condition data. Specifically, an integrated voltage obtained by integrating the high frequency component of the detection signal is employed as the road surface condition data. In this configuration, the vehicle side device estimates a road surface friction coefficient (hereinafter, referred to as a road surface μ) based on the integrated voltage.

When the tire side device transmits the road condition data to the vehicle side device each time the tire makes one rotation, electric power necessary for the transmission increases. In addition, the power source of the tire side device increases in size. Thus, in order to save electric power, the transmission of the road surface condition data from the tire side device may be limited when the data is necessary.

In an embodiment of the present disclosure, a road surface condition estimation apparatus stops data transmission when a transmission stop condition of the road surface condition data is satisfied. With this configuration, the data transmission is not always performed. Thus, it is possible to reduce electric power required for transmission.

Hereinafter, embodiments of the present disclosure will be described with reference to the drawings. In the following embodiments, the same or equivalent parts are denoted by

First Embodiment

A road surface condition estimation apparatus according to the present embodiment will be described with reference to FIG. 1 to FIG. 7. The road surface condition estimation apparatus according to the present embodiment is employed for estimating a road surface condition in response to a vibration in a contact surface of a tire attached to each of wheels of the vehicle.

As shown in FIG. 1, the road surface condition estimation apparatus 100 includes a tire side device 1 attached to the tire and a vehicle side device 2 attached to the vehicle body. In the road surface condition estimation apparatus 100, the tire side device 1 transmits data indicative of a condition of the road surface on which the vehicle travels to the vehicle side device 2, and the vehicle side device 2 estimates the road surface condition based on the received data. Specifically, the tire side device 1 and the vehicle side device 2 are provided as follows.

As shown in FIG. 1, the tire side device 1 includes a vibration power generation element 11, a power supply circuit 12, a signal processing circuit 13, and a transmitter 14. The tire side device 1 is attached to the back side of the tread 31 of the tire 3, as shown in FIG. 2.

Figure 2:
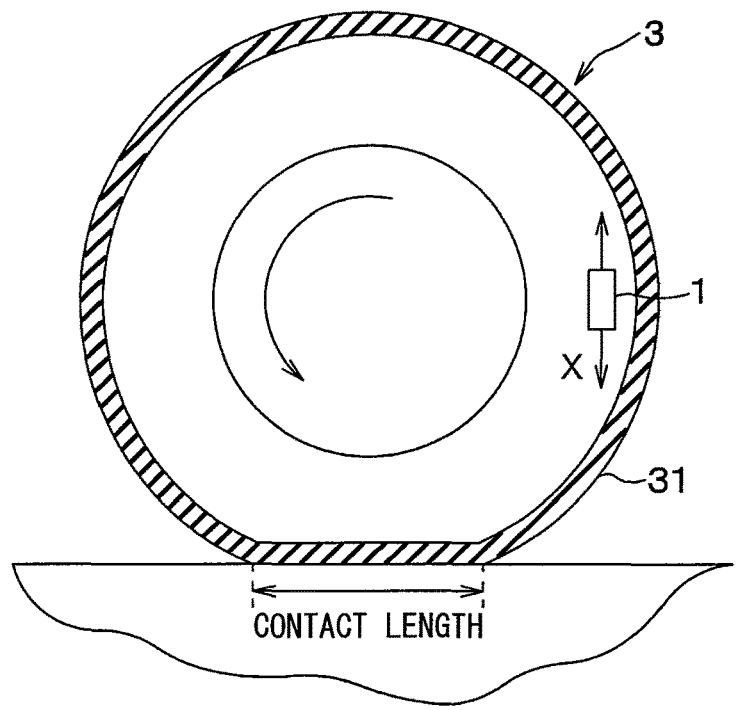
FIG. 2 is a diagram schematically showing a cross-sectional view of a tire attached to a tire side device.

When the tire 3 rotates, the vibration power generation element 11 transmits the detection signal in response to the vibration in a direction that contacts a circular orbit drawn by the tire side device 1, that is, in the tangential direction of the tire shown by an arrow X in FIG. 2. The vibration power generation element 11 corresponds to a vibration detection portion. In the present embodiment, in addition to the transmission of the detection signal in response to the vibration in the tangential direction of the tire, the vibration power generation element 11 converts vibration energy into electric energy, and generates the power supply of the tire side device 1 based on converted electric energy. Thus, the vibration power generation element 11 is arranged so as to generate electric energy with the vibration in the tangential direction of the tire. The vibration power generation element 11 may be provided by an electrostatic induction type power generation element (for example, an electret), a piezoelectric element, a friction type element, a magnetostriction type element, or an electromagnetic induction type element. When the vibration power generation element 11 transmits the detection signal in response to the vibration in the tangential direction of the tire without generating electric power, an acceleration sensor or the like is employed.

The electrostatic induction type power generation element may be employed as the vibration power generation element 11. In this case, an upper electrode is positively charged by electrostatic induction, whereas a lower electrode is negatively charged. When the upper electrode vibrates in the horizontal direction, the electric charge fluctuates due to electrostatic induction and electricity is generated by generating electromotive force. Based on the power generation of the vibration power generation element 11, the power supply of the tire side device 1 is generated, and the detection signal corresponding to the magnitude of vibration in the tangential direction of the tire is generated.

That is, when a vehicle having the road surface condition estimation apparatus 100 travels, the tread 31 of the tire 3 vibrates due to various types of factors such as the rotational motion of the tire 3 or the unevenness of the road surface. When the vibration is transmitted to the vibration power generation element 11, the vibration power generation element 11 generates electric energy. Electric energy is transmitted to the power supply circuit 12, so as to generate the power supply of the tire side device 1. Further, the output voltage at the time of the power generation by the vibration power generation element 11 is changed corresponding to the magnitude of vibration. Thus, the output voltage of the vibration power generation element 11 is transmitted to the signal processing circuit 13 as the detection signal indicative of the magnitude of the vibration in the tangential direction of the tire. The upper electrode is reciprocated by the vibration, so that the output voltage of the vibration power generation element 11 is an AC voltage.

The power supply circuit 12 stores electric energy and generates electric power based on the output voltage of the vibration power generation element 11, and supplies electric power to the signal processing circuit 13 and the transmitter 14. The power supply circuit 12 includes a rectifier circuit 15 and a power storage circuit 16.

The rectifier circuit 15 converts the AC voltage output from the vibration power generation element 11 into a DC voltage. The rectifier circuit 15 is provided by a well-known circuit. The AC voltage output from the vibration power generation element 11 is converted into the DC voltage by the rectification circuit 15, and the DC voltage is output to the power storage circuit 16. The rectifier circuit 15 may be provided by a full-wave rectifier circuit or a half-wave rectifier circuit.

The power storage circuit 16 stores the DC voltage applied from the rectifier circuit 15, and is provided by a capacitor or the like. The output voltage of the vibration power generation element 11 is stored in the power storage circuit 16 via the rectification circuit 15. The voltage stored in the power storage circuit 16 is employed as the power source, and the power source supplies electric power to the signal processing circuit 13, the transmitter 14, and the like included in the tire side device 1. In addition, since the power supply circuit 12 includes the storage circuit 16, the surplus of electric power is stored in the power supply circuit 12 when the vibration power generation element 11 generates excess power. With this configuration, when the power generation amount is insufficient, the stored electric power can be covered.

The signal processing circuit 13 corresponds to a signal processing portion. The signal processing circuit 13 employs the output voltage of the vibration power generation element 11 as the detection signal indicative of the vibration data in the tangential direction of the tire. In this configuration, the signal processing circuit 13 obtains the data indicative of the road surface condition by processing the detection signal, and transmits the data related to the road surface condition to the transmitter 14. That is, the signal processing circuit 13 extracts a contact section of the vibration power generation element 11 during rotation of the tire 3 in response to the change over time of the output voltage of the vibration power generation element 11. The contact section represents a section of the tread 31 of the tire 3 corresponding to a part attaching the vibration detection portion contacts a road. In the present embodiment, the position of the vibration power generation element 11 corresponds to the position of the tire side device 1, so that the contact section has the same meaning as the section in which the part of the tread 31 of the tire 3 corresponding to the section of the tire side device 1 contacts the road surface. Hereinafter, the section of the tread 31 of the tire 3 corresponding to the position of the vibration power generation element 11 or the position of the tire side device 1 is referred to as a device attached position.

The high frequency component included in the detection signal corresponding to the contact section of the vibration power generation element 11 represents the road surface condition. Thus, the signal processing circuit 13 extracts the high frequency component, generates the data indicative of the road surface condition based on the high frequency component, and transmits the data to the transmitter 14.

Specifically, the signal processing circuit 13 may be provided by a conventional microcomputer including a CPU, a ROM, a RAM, an I/O and the like, and executes the processing described above based on the output voltage of the vibration power generation element 11. The signal processing circuit 13 includes a section extraction portion 17, a level calculation portion 18, and a transmission control portion 19 in order to execute the above-described processing.

The section extraction portion 17 detects a peak value of the detection signal indicated by the output voltage of the vibration power generation element 11. In this configuration, the section extraction portion 17 extracts the contact section of the vibration power generation element 11, and notifies the level calculation portion 18 that the vibration power generation element 11 is corresponding to the contact section. The section extraction portion 17 generates a transmission trigger. The transmission trigger causes the transmitter 14 to transmit the calculation result of the level calculation portion 18 as the road surface condition data indicative of the road surface condition to the vehicle side device 2. Hereinafter, the function of the section extraction portion 17 will be specifically described.

Figure 3:
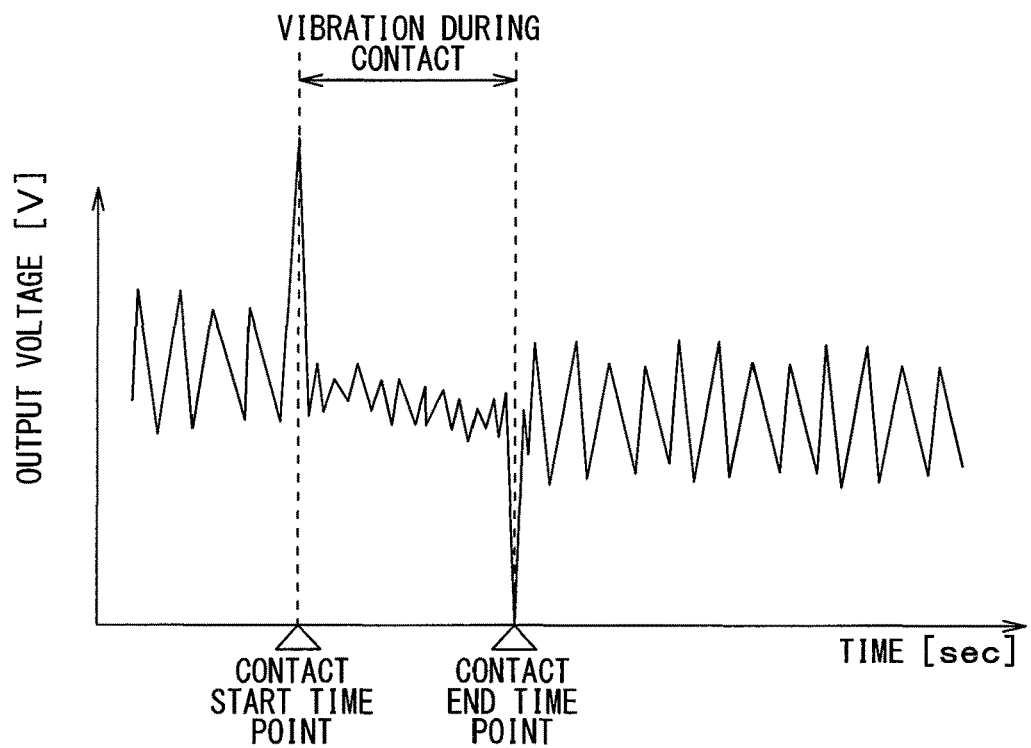
FIG. 3 is a diagram showing an output voltage waveform of a vibration power generation element during tire rotation.

The output voltage waveform of the vibration power generation element 11 during tire rotation changes as shown in FIG. 3, for example. A contact start time point is defined when the device attached position starts contacting the road surface during rotation of the tire 3. As shown in FIG. 3, at the contact start time point, the output voltage of the vibration power generation element 11 takes a maximum value. The section extraction portion 17 detects the contact start time point, at which the output voltage of the vibration power generation element 11 takes the maximum value, as a first peak value time point. Further, a contact end time point is defined when the device attached position ends contacting the road surface during rotation of the tire 3. As shown in FIG. 3, at the contact end time point, the output voltage of the vibration power generation element 11 takes a minimum value. The section extraction portion 17 detects the contact end time point, at which the output voltage of the vibration power generation element 11 takes the minimum value, as a second peak value time point.

The output voltage of the vibration power generation element 11 takes the peak values at the above-described time points for the following reasons. When the device attached position comes to contact the road surface during rotation of the tire 3, the part of the tire 3 having been in approximately cylindrical shape in the vicinity of the vibration power generation element 11 is pressed and deformed in a plane shape. With reception of an impact at this time, the output voltage of the vibration power generation element 11 takes the first peak value. When the device attached position leaves the road surface during rotation of the tire 3, the part of the tire 3 is released from pressurization in the vicinity of the vibration power generation element 11 and is restored to the approximately cylindrical shape from the plane shape. With reception of an impact at this time of being restored to the original shape of the tire 3, the output voltage of the vibration power generation element 11 takes the second peak value. With this configuration, the output voltage of the vibration power generation element 11 takes the first peak value and the second peak value at the contact start time point and the contact end time point, respectively. Since a direction of impact when the tire 3 is pressed and a direction of impact when the tire 3 is released from pressurization are opposite, polarities of the output voltages are also opposite.

The section extraction portion 17 notifies the level calculation portion 18 of the time points of the first and second peak values. The section extraction portion 17 commands the level calculation portion 18 to rectify and integrate the high frequency component included in the output voltage of the vibration power generation element 11 for an interval from the time point of the first peak value to the time point of the second peak value. With this configuration, the section extraction portion 17 extracts the contact section of the vibration power generation element 11, and notifies the level calculation portion 18 that the vibration power generation element 11 is corresponding to the contact section.

Since the time point at which the output voltage of the vibration power generation element 11 takes the second peak value becomes the contact end time point of the acceleration sensor 11, the section extraction portion 17 transmits the transmission trigger to the transmitter 14 at this time point. In this configuration, the transmitter 14 is caused to transmit the calculation result transmitted from the level calculation portion 18 as the road surface condition data. Thus, the transmitter 14 does not continuously transmit the data but limitedly transmits the data at the contact end time point of the vibration power generation element 11, so that the configuration can reduce power consumption. When the road condition data is transmitted each time the tire 3 makes one rotation, electric power necessary for transmission increases. In addition, the power source of the tire side device 1 increases in size. Thus, in order to save electric power, the transmission of the road surface condition data may be limited to a time point at which the data is necessary. Thus, in the present embodiment, the transmission control portion 19, which will be described later, detects a time point at which data transmission is not required, so that the data transmission by the transmitter 14 is not performed at this time.

When the section extraction portion 17 notifies the level calculation portion 18 that the vibration power generation element 11 is within the contact section, the level calculation portion 18 calculates the level of the high frequency component included in the output voltage of the vibration power generation element 11 corresponding to the contact section. When the vehicle travels on a road having the same road surface condition at a constant speed, the level of the high frequency component becomes substantially constant. In this configuration, the road surface condition can be detected by calculating the level of the high frequency component. Thus, the level calculation portion 18 notifies the transmitter 14 of the calculation result as the road surface condition data indicative of the road surface condition. The level of the high frequency component is calculated as an index indicative of the road surface condition for the reasons which will be described below with reference to FIG. 4A, FIG. 4B and FIG. 5.

Figure 4A:
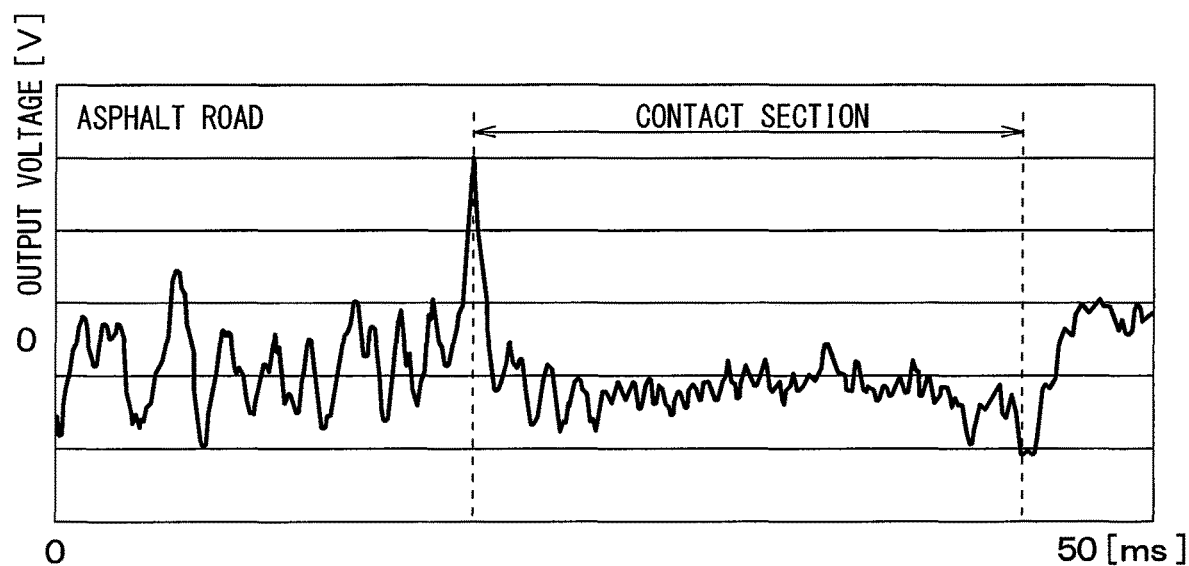
FIG. 4A is a diagram showing a change in an output voltage of the vibration power generation element when a vehicle travels on a high μ road surface, which has relatively high road surface friction coefficient (hereinafter, referred to as p), such as an asphalt road.
Figure 4B:
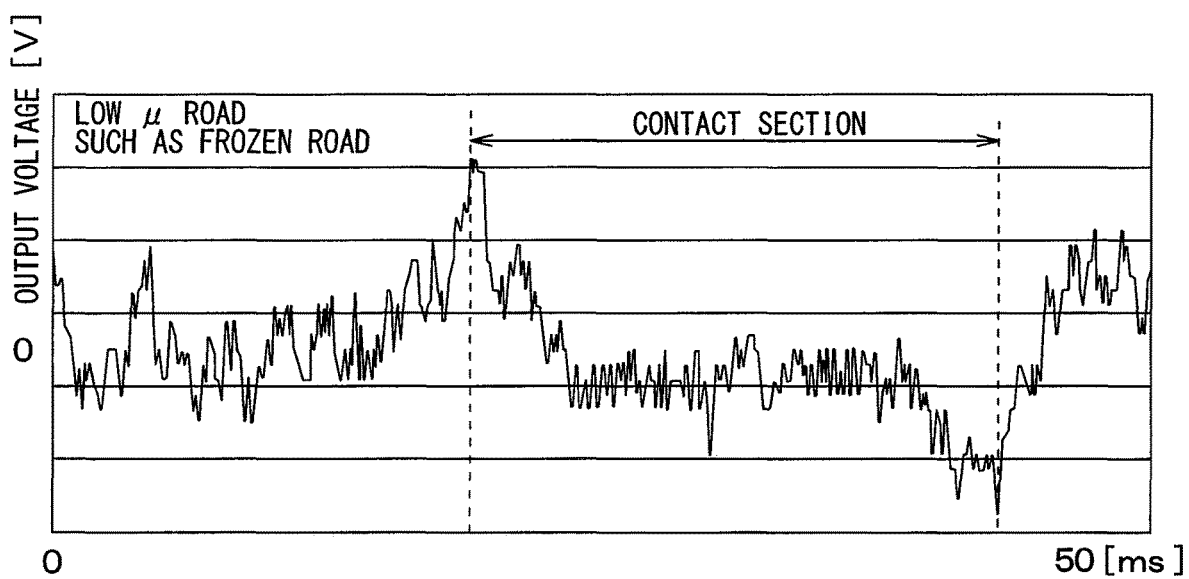
FIG. 4B is a diagram showing a change in an output voltage of the vibration power generation element when the vehicle travels on a low μ road surface, which has relatively low road surface friction coefficient, such as a frozen road.

FIG. 4A shows a change in the output voltage of the vibration power generation element 11 when the vehicle travels on a high $\mu$ road surface, which has relatively high road surface $\mu$, such as an asphalt road. FIG. 4B shows a change in the output voltage of the vibration power generation element 11 when the vehicle travels on a low $\mu$ road surface, which has relatively low road surface $\mu$, such as a frozen road.

Figure 5:
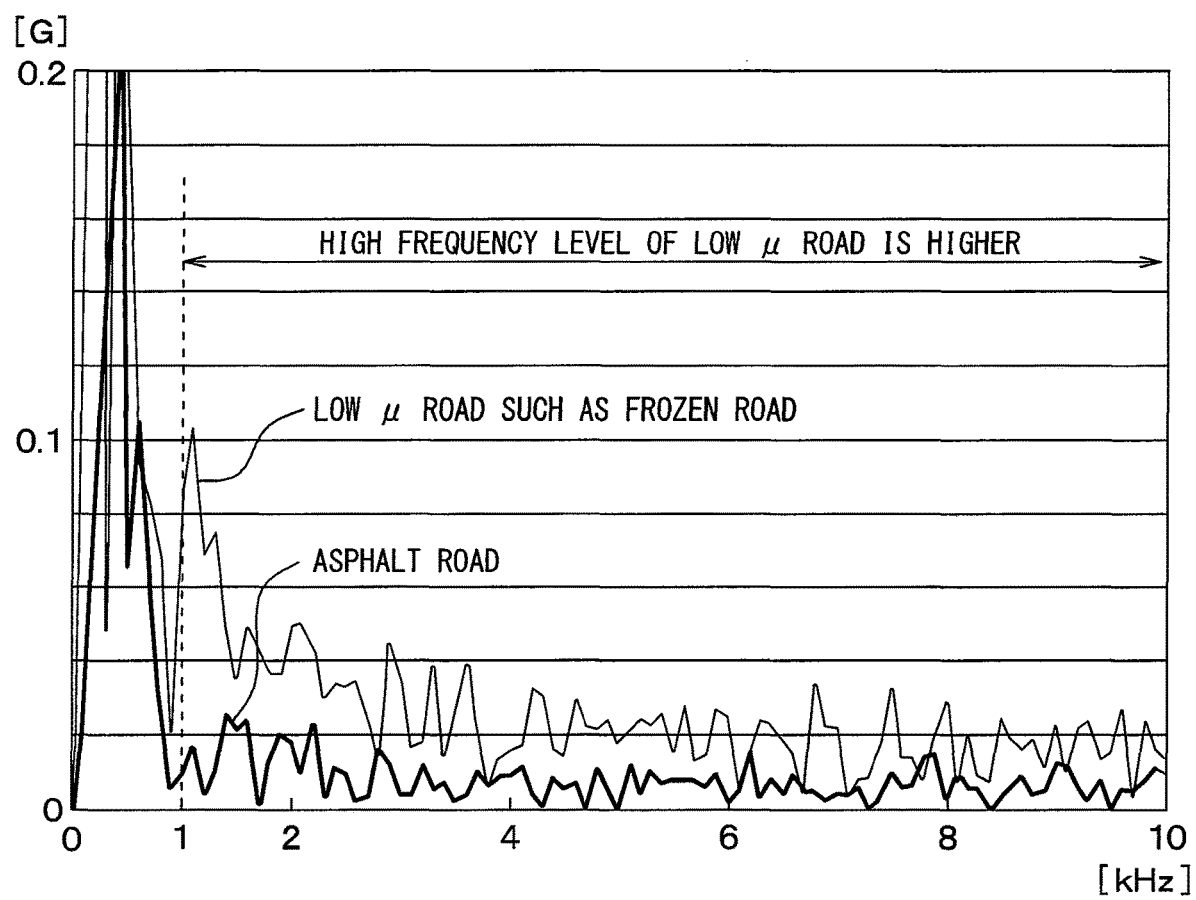
FIG. 5 is a diagram showing a result of frequency analysis performed on the output voltage in a contact section with respect to each case of traveling on the high μ road surface and the low μ road surface.

As shown in FIG. 4A and FIG. 4B, the first peak value and the second peak value are taken at the start and the end of the contact section, that is, the contact start time point and the contact end time point of the device attached position, respectively, regardless of the road surface μ. When the vehicle travels on the low μ road surface, due to the influence of the road surface μ, the high frequency vibration due to a slip of the tire 3 is superimposed on the output voltage. Frequency analysis of the output voltage corresponding to the contact section when the vehicle travels on the high μ road surface and low μ road surface are shown in FIG. 5. That is, in a low frequency band, the level is high regardless of traveling on the high μ road surface or on the low μ road surface. On the other hand, in a high frequency band of equal to or more than 1 kHz, the level is higher in case of traveling on the low μ road surface than in case of traveling on the high μ road surface. Thus, the level of the high frequency component of the output voltage of the vibration power generation element 11 is employed as the index indicative of the road surface condition.

With the above-described configuration, the level calculation portion 18 calculates the level of the high frequency component of the output voltage of the vibration power generation element 11 corresponding to the contact section, so as to employ the calculated level as the road surface condition data. For example, the high frequency component level can be calculated by extracting the high frequency component from the output voltage of the vibration power generation element 11 and integrating the extracted high frequency component for the interval of the contact section.

Figure 6:
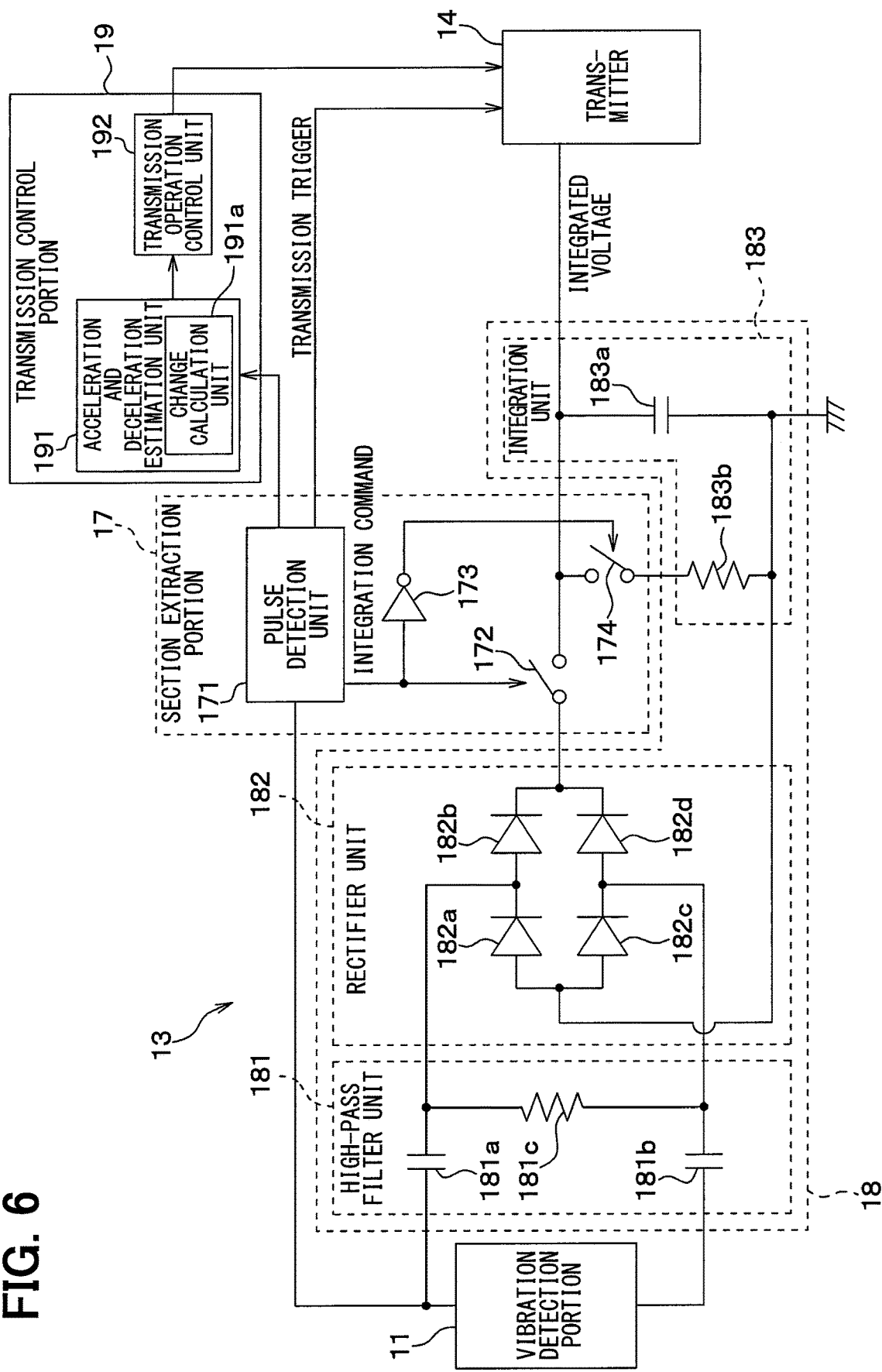
FIG. 6 is a diagram showing a specific configuration of a signal processing circuit when a level of a high frequency component is calculated by integrating the high frequency component extracted corresponding to the contact section.

FIG. 6 is a diagram showing a specific configuration of the signal processing circuit 13 applied when the level of the high frequency component is calculated by integrating the extracted high frequency component for the interval of the contact section.

In FIG. 6, the section extraction portion 17 receives the output voltage of the vibration power generation element 11 as the detection signal, transmits the integration command signal to the level calculation portion 18 based on the analysis result of the detection signal, and transmits the transmission trigger to the transmitter 14.

Specifically, the section extraction portion 17 includes a pulse detection unit 171. The pulse detection unit 171 detects the peaks of the detection signals at the contact start time point and the contact end time point of the vibration power generation element 11. The pulse detection unit 171 transmits the integration command signal when the detection signal of the vibration power generation element 11 takes the first peak value. The pulse detection unit 171 cancels the integration command signal when the detection signal of the vibration power generation element 11 takes the second peak value. In the present embodiment, a switch 172 is turned on in response to the input of a high level as the integration command signal from the pulse detection unit 171. Since an inverter 173 inverts the integration command signal to a low level, a switch 174 is turned off and the integration of the high frequency component is started. When the integration command signal is canceled and the output of the pulse detection unit 171 becomes the low level, the switch 172 is turned off. Since the inverter 173 inverts the integration command signal to the high level, a switch 174 is turned on and the integration of the high frequency component ends.

The level calculation portion 18 includes a high-pass filter unit 181, a rectifier unit 182, and an integration unit 183.

The high-pass filter unit 181 extracts a high frequency component of the detection signal of the vibration power generation element 11. The high-pass filter unit 181 is provided by a CR filter circuit having capacitors 181a, 181b and a resistor 181c. The high-pass filter unit 181 passes through the high frequency component of the detection signal of the vibration power generation element 11 by adjusting capacitance in the capacitors 181a, 181b and resistance in the resistor 181c.

The rectifier unit 182 is provided by a full-wave rectifier circuit having diodes 182a to 182d arranged in a bridge shape. The rectifier unit 182 rectifies the full wave of the high frequency component of the detection signal extracted by the high-pass filter unit 181. With this configuration, the rectifier unit 182 is capable of applying the positive voltage after full-wave rectification to the integration unit 183.

The integration unit 183 integrates the high frequency component of the detection signal of the vibration generating element 11. In the present embodiment, the integration unit 183 is provided by a capacitor 183a and a resistor 183b.

The capacitor 183a is charged based on the high frequency component after full-wave rectification. The charged voltage of the capacitor 183a corresponds to a value obtained by integrating the high frequency component. The integrated voltage of the capacitor 183a is transmitted to the transmitter 14 as the data indicative of the road surface condition. That is, as shown in FIG. 5, the level of the high frequency component of the detection signal of the vibration power generation element 11 is different between the case where the vehicle travels on the low μ road surface and the case where the vehicle travels on the high μ road surface. Thus, the integrated voltage of the capacitor 183a changes corresponding to the road surface condition.

Figure 7:
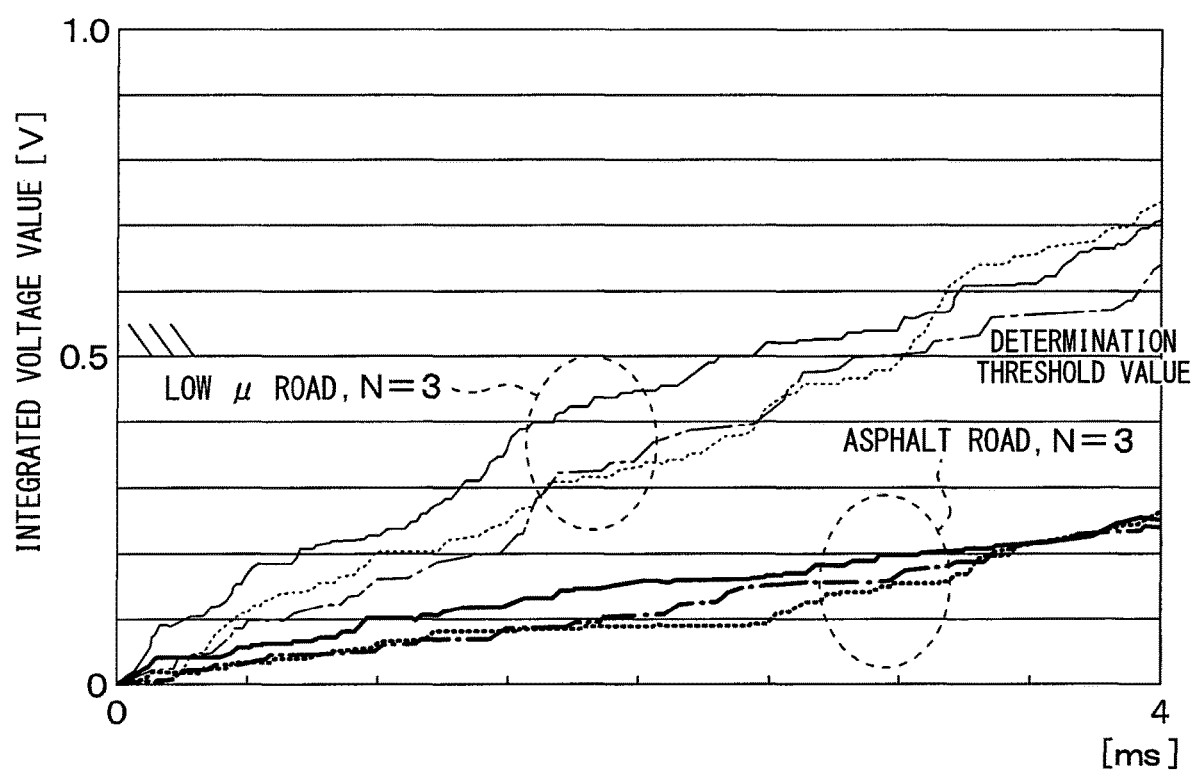
FIG. 7 is a diagram showing a charge of a capacitor with respect to each case of traveling on the high μ road surface and the low μ road surface.

FIG. 7 shows the charge of the capacitor 183a when the vehicle travels on the low μ road surface and when the vehicle travels on the high ρ road surface. For each case, it is tried for three times, that is, the number of trials is N=3. As shown in FIG. 7, when the vehicle travels on the low μ road surface, the level of the high frequency component of the detection signal of the vibration power generation element 11 is higher than the level of which the vehicle travels on the high μ road surface. Thus, when the vehicle travels on the low μ road, the integrated voltage of the capacitor 183a becomes greater. The magnitude of the integrated voltage of the capacitor 183a changes corresponding to the road surface condition, so that the integrated voltage of the capacitor 183a can indicate the road surface condition.

When the pulse detection unit 171 cancels the integration command signal and the switch 174 is turned on, the capacitor 183a is discharged by connecting the resistor 183b with the capacitor 183a. With this configuration, the voltage of the capacitor 183a can be reset to zero for the next integration of the high frequency component.

With the above-described circuit, the signal processing circuit 13 is provided. The integration unit 183 integrates the high frequency component of the output voltage of the vibration power generation element 11 so as to calculate the level of the high frequency component corresponding to the contact section.

As a time period for which there is no need for data transmission, the transmission control portion 19 detects that the vehicle accelerates or decelerates. The transmission control portion 19 causes the transmitter 14 not to transmit the data while the vehicle accelerates or decelerates. As will be described later, while the vehicle accelerates or decelerates, the vehicle side device 2 is capable of estimating the road surface μ based on the detection signal of a wheel speed sensor or the like. Thus, in this time period, the vehicle side device 2 does not estimate the road surface μ based on the road surface condition data transmitted from the tire side device 1, but estimates the road surface μ based on the wheel speed or the like. Thus, the transmission control portion 19 estimates that the vehicle accelerates or decelerates. While the vehicle accelerates or decelerates, the transmission control portion 19 commands the transmitter 14 to stop transmitting the data, so that the transmitter 14 does not transmit the data. With this configuration, power consumption can be further reduced, and power saving of the tire side device 1 can be performed.

Specifically, as shown in FIG. 6, the transmission control portion 19 of the present embodiment includes an acceleration and deceleration estimation unit 191 and a transmission operation control unit 192.

The acceleration and deceleration estimation unit 191 estimates that the vehicle accelerates and decelerates based on the detection signal of the vibration power generation element 11. As described above, during rotation of the tire 3, the output voltage waveform of the vibration power generation element 11 is shown in FIG. 3. While the vehicle accelerates or decelerates, the rotation of the tire 3 also accelerates or decelerates. Thus, the output voltage waveform of the vibration power generation element 11 is changed. Based on the change in the output voltage waveform, the acceleration and deceleration estimation unit 191 estimates whether the vehicle accelerates or decelerates. The state whether the vehicle accelerates or decelerates is capable of being detected based on the input of the detection signal of the vibration power generation element 11 to the acceleration and deceleration estimation unit 191 or the input of the time point of the peak of the detection signal of the vibration power generation element 11 detected by the pulse detection unit 171. As shown in FIG. 6, the acceleration and deceleration estimation unit 191 detects whether the vehicle accelerates or decelerates by inputting the time point indicating the peak of the detection signal of the vibration power generation element 11 detected by the pulse detection unit 171.

Specifically, the acceleration and deceleration estimation unit 191 includes a change calculation unit 191a. The acceleration and deceleration estimation unit 191 estimates whether the vehicle accelerates or decelerates based on the calculation result of the change calculation unit 191a.

For example, a contact time interval may be defined as a time for which the device attached position contacts the road surface, that is, from the contact start time point to the contact end time point. In this case, the contact time interval is changed while the vehicle accelerates or decelerates. With the change of the contact time interval, it is possible to estimate whether the vehicle accelerates or decelerates. In this case, the change calculation unit 191a calculates a contact time interval change. The contact time interval change may be a change of the contact time interval of the present rotation to a past contact time interval, such as a contact time interval of one previous rotation of the tire 3. Difference between the present time interval and the past contact time interval may be employed as the contact time interval change. The acceleration and deceleration estimation unit 191 estimates whether the vehicle accelerates or decelerates by comparing the contact time interval change calculated by the change calculation unit 191a with a threshold value.

The time interval for which the tire 3 makes one rotation is defined as one rotation time interval. In this case, the one rotation time interval is changed while the vehicle accelerates or decelerates. With the change of the one rotation time interval, it is possible to estimate whether the vehicle accelerates decelerates. In this case, the change calculation unit 191a calculates the one rotation time interval based on the detection signal of the vibration power generation element 11. For example, since the output voltage waveform shown in FIG. 3 appears each time the tire 3 makes one rotation, a time interval between the first peak values temporally in a row or the time interval between the second peak values temporally in a row is employed as the time interval for which the tire 3 makes one rotation. Thus, in the change calculation unit 191a, the time interval of the time points of taking the first peak values between one previous rotation and present rotation, or the time interval of the time points of taking the second peak values between one previous rotation and present rotation is calculated as one rotation time interval. Further, the change calculation unit 191a calculates the change of the one rotation time interval. For example, the time difference between one rotation time intervals is employed as the rotation time interval change. The acceleration and deceleration estimation unit 191 may estimate whether the vehicle accelerates or decelerates by comparing the rotation time interval change calculated by the change calculation unit 191a with a threshold value.

The acceleration and deceleration estimation unit 191 estimates whether the vehicle accelerates or decelerates by comparing the contact time interval change or the rotation time interval change calculated with a predetermined threshold value using the change calculation unit 191a. The predetermined threshold value described above differs in value when the contact time interval change is employed or when the rotation time interval change is employed.

For example, the time difference of the contact time interval between one previous rotation and present rotation may be employed as the contact time interval change. In this case, the contact time interval for present rotation is longer than the contact time interval for one previous rotation when the vehicle decelerates, and the relationship is reversed while the vehicle accelerates. Thus, the value for subtracting the contact time interval of one previous rotation from the contact time interval of present rotation may be defined as the time difference. In this case, it is estimated that the vehicle decelerates when the time difference exceeds a first threshold value having a positive value, and the vehicle accelerates when the time difference is smaller than a second threshold value having a negative value.

Similarly, the time difference of the one rotation time interval between one previous rotation and present rotation may be employed as the rotation time interval change. In this case, the rotation time interval for present rotation is longer than the rotation time interval for one previous rotation while the vehicle decelerates, and the relationship is reversed while the vehicle accelerates. Thus, the value for subtracting the rotation time interval of one previous rotation from the rotation time interval of present rotation may be defined as the time difference. In this case, it is estimated that the vehicle decelerates when the time difference exceeds a first threshold value having a positive value, and the vehicle accelerates when the time difference is smaller than a second threshold value having a negative value.

The first threshold value and the second threshold value compared with the contact time interval change and the first threshold value and the second threshold value compared with the rotation time interval change are independently set. Further, the acceleration and deceleration of the vehicle may be assumed that the driver depresses an accelerator pedal and a brake pedal, respectively. The accelerator pedal and the brake pedal are not shown in figures. Thus, each of the threshold values is set for assuming when acceleration or deceleration of, for example, 0.1 G to 0.21 G is generated.

The transmission operation control unit 192 receives the estimated result of the acceleration and deceleration estimation unit 191. When receiving the estimated result indicating that the vehicle accelerates or decelerates, the transmission operation control unit 192 transmits the command signal that commands to stop transmitting the data to the transmitter 14. The transmission operation control unit 192 continues transmitting the command signal during acceleration or deceleration of the vehicle. With this configuration, the transmitter 14 does not transmit the data during the period of receiving the command signal. Thus, it is possible to prevent transmission of the road surface condition data each time the tire 3 makes one rotation. In addition, it is possible to reduce electric power required for transmission of the data and to prevent an increase in the size of the power source of the tire side device 1.

The transmitter 14 transmits the road surface condition data received from the signal processing circuit 13 to the vehicle side device 2. Communication between the transmitter 14 and the transceiver 21 included in the vehicle side device 2 is capable of being executed via a well-known short-distance wireless communication technology such as Bluetooth. Bluetooth is a registered trademark. The time point for transmitting the road surface condition data is arbitrary. As described above, in the present embodiment, when the transmission trigger is transmitted from the section extraction portion 17 at the contact end time point of the device attached position, the transmitter 14 starts transmission of the road surface condition data. Further, even when the transmission trigger is transmitted, the transmitter 14 does not perform data transmission in a case where the transmitter 14 receives the command signal that commands to stop transmission of the data form the transmission control portion 19. Thus, the transmitter 14 does not continuously transmit the data but limitedly transmit the data at the contact end time point of the vibration power generation element 11, so that the configuration can reduce power consumption. Further, since the data transmission is not performed at the time of acceleration and deceleration of the vehicle, it is possible to reduce electric power required for transmission and to prevent the increase in the size of the power supply of the tire side device 1.

The road surface condition data may be transmitted together with the individual identification information (hereinafter, referred to as ID information) of each wheel which is previously provided for each tire 3 of the vehicle. The position of each wheel is capable of being identified by a well-known wheel position detection device that detects where the wheel is attached to the vehicle. With this configuration, it is possible to determine which tire corresponds to the road surface condition data that have been transmitted. Normally, it is assumed that the road surface μ of the traveling road surface is uniform. There may be a μ split road, which has different road surface μ with the left and right wheels of the vehicle. In such μ split road, the road surface condition data may be transmitted by each wheel. Alternatively, instead of estimating the road surface condition by each wheel, the road surface condition may be estimated using multiple road surface condition data. For example, the estimation of the road surface condition is performed using an average value of the integrated voltage indicated by the road surface condition data transmitted from each wheel.

The vehicle side device 2 includes a receiver 21, a situation estimation portion 22, an information acquisition portion 23, and a wheel speed input portion 24. With this configuration, the vehicle side device 2 executes various pieces of processing based on the road surface condition data received from the tire side device 1, or detects the condition of the road surface on which the vehicle travels based on various pieces of information obtained from the information acquisition portion 23 or a wheel speed input portion 24.

The receiver 21 receives the road surface condition data transmitted by the tire side device 1. The road surface condition data received by the receiver 21 is successively transmitted to the situation estimation portion 22 each time the road surface condition data is received.

The situation estimation portion 22 is provided by a conventional microcomputer including a CPU, a ROM, a RAM, an I/O and the like and executes the processing for detecting the road surface condition based on a program stored in the ROM or the like. Specifically, the situation estimation portion 22 estimates the road surface μ based on the magnitude of the integrated voltage indicated by the road surface condition data. For example, when the integrated voltage is greater than the determination threshold value, the situation estimation portion 22 determines that the vehicle travels on a low μ road, and when the integrated voltage is smaller than the determination threshold value, the vehicle travels on the high μ road. As shown in FIG. 7, the determination threshold value is set to an intermediate value set between an assumed integrated voltage for traveling on the low μ road and an assumed integrated voltage for traveling on a high μ road. Thus, it is possible to estimate the condition of the road surface on which the vehicle travels by comparing the integrated voltage with the determination threshold value.

While the vehicle accelerates or decelerates, the road surface condition data are not transmitted from the tire side device 1. The vehicle side device 2 can estimate the condition of the road surface on which the vehicle travels based on various types of information items, such as the wheel speed that can be acquired by the vehicle side device 2. While the vehicle accelerates or decelerates, the wheel slip occurs. In this configuration, the situation estimation portion 22 estimates the road surface condition such as the road surface μ based on the wheel speed of each wheel or various types of information items received from the information acquisition portion 23. Various methods are known for estimating the road surface condition such as the road surface μ by the vehicle side device 2, so the details will be omitted, but any of various methods may be employed. For example, it is possible to estimate the road surface μ from the wheel acceleration or wheel deceleration calculated by the wheel speed, the wheel load obtained by the wheel load detection, the brake fluid pressure of each wheel or driving torque of each wheel (see, for example, JP H11-48938 A). Further, together with the calculation of the estimated vehicle speed based on the wheel speed, the slip ratio indicated as the deviation of the wheel speed with respect to the estimated vehicle speed is calculated. Based on the slip ratio, it is possible to estimate the road surface μ (see, for example, JP H11-334555 A). In addition, it is possible to estimate the road surface μ from the sum of the vector of the longitudinal acceleration and the lateral acceleration (see, for example, JP H11-034828 A). With any one of these methods, while the vehicle accelerates or decelerates, the vehicle side device 2 can estimate the road surface condition such as the road surface μ.

The information acquisition portion 23 acquires an information item necessary for the situation estimation portion 22 to estimate the road surface condition such as the road surface μ. The information acquisition portion 23 may be provided by various types of sensors. Alternatively, the information acquisition portion 23 may be provided by a device that acquires various types of information items indicative of the traveling condition of the vehicle from another electronic control unit. For example, the information acquisition portion 23 may acquire the brake fluid pressure from the electronic control unit for brake control (hereinafter, referred to as a brake ECU), the driving torque from the electronic control unit for engine control (hereinafter, referred to as an engine ECU), or the like. The information acquisition portion 23 acquires the result of the wheel load detection from an electronic control unit for suspension control (hereinafter, referred to as a suspension ECU) or the like. The information acquisition portion 23 is connected to various types of ECUs such as the brake ECU, the engine ECU and the suspension ECU via, for example, CAN (Controller Area Network) of vehicle network, so that the information acquisition portion 23 captures various types of information items from the ECUs.

The wheel speed input portion 24 may be provided by a wheel speed sensor. Alternatively, the wheel speed input portion 24 may be provided by a device that acquires an information item related to wheel speed from the brake ECU. Alternatively, the information acquisition portion 23 may also serve as the wheel speed input portion 24, and acquires the information item related to the wheel speed.

With the above-described configuration, the vehicle side device 2 is provided. As described above, the vehicle side device 2 estimates the road surface condition based on the road surface condition data transmitted from the tire side device 1 while the vehicle does not accelerates and decelerates. On the other hand, while the vehicle accelerates or decelerates, the vehicle side device 2 estimates the condition of the road surface on which the vehicle is traveling based on the various types of information items that can be acquired by the vehicle side device 2.

When the vehicle side device 2 estimates the road surface condition with the above-described method, the estimated result may be transmitted via the vehicle communication such as CAN communication. The brake ECU may receive the estimated result of the road surface condition. The estimated result may be employed as an index for controlling the vehicle motion such as the anti-lock brake control. The index may be employed for setting a threshold value of control start for the anti-lock brake control.

As described above, the road surface condition estimation apparatus 100 according to the present embodiment causes the tire side device 1 to calculate the level of the high frequency component of the detection signal of the vibration power generation element 11 corresponding to the contact section of the tire 3, and to transmit the level as the road surface condition data. Specifically, the tire side device 1 obtains the integrated voltage of the high frequency component of the detection signal of the vibration power generation element 11 corresponding to the contact section, and the integrated voltage is employed as the road surface condition data. Then, the vehicle side device 2 receives the road surface condition data, and estimates the condition of the road surface on which the vehicle travels. With this configuration, it is possible to estimate the road surface condition without performing frequency analysis.

While the vehicle accelerates or decelerates, the condition of the road surface on which the vehicle travels is estimated based on various types of information items, such as the wheel speed that can be acquired by the vehicle side device 2. In this configuration, the transmitter 14 does not perform the data transmission. Thus, the data transmission by the transmitter 14 is not always performed, that is, not performed while the vehicle accelerates or decelerates. With this configuration, it is possible to reduce electric power required for transmission and to prevent the increase in the size of power source of the tire side device 1.

Second Embodiment

A second embodiment will be described. The present embodiment is different from the first embodiment in the configuration of the transmission control portion 19, and the other parts are similar to the first embodiment, so only the difference from the first embodiment will be described.

In the above-described embodiment, when the estimation of the road surface condition can be performed only by the vehicle side device 2, the transmission control portion 19 transmits the command that stops the data transmission in order not to transmit the data from the transmitter 14. In addition, in the present embodiment, when the data acquired by the tire side device 1 is not suitable for estimating the road surface condition, the transmission control portion 19 transmits the command that stops the data transmission in order not to transmit the data from the transmitter 14.

Figure 8:
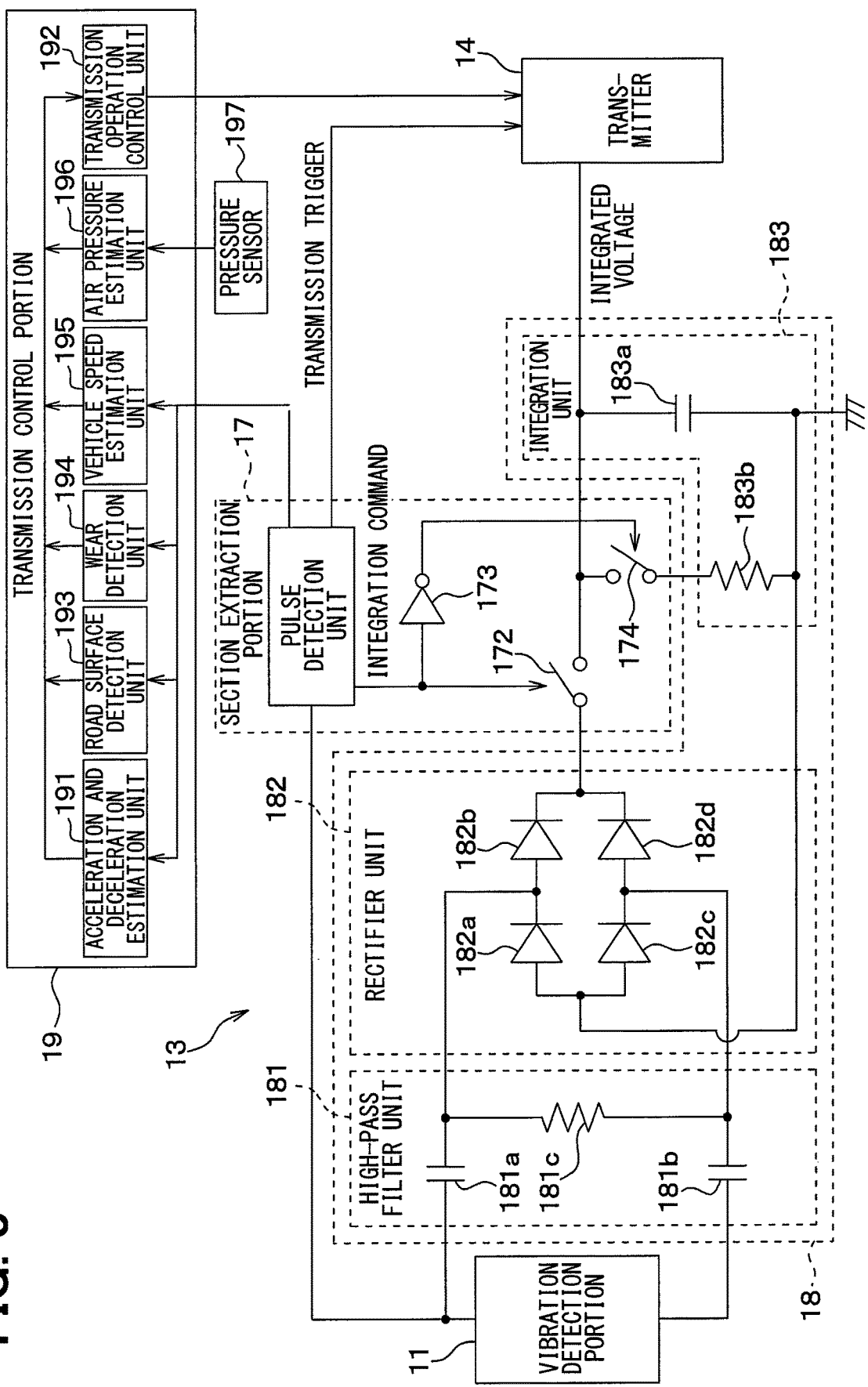
FIG. 8 is a diagram showing a specific configuration of a signal processing circuit in a road surface condition estimation apparatus according to a second embodiment.

Specifically, as shown in FIG. 8, in the present embodiment, the transmission control portion 19 includes the acceleration and deceleration estimation unit 191 and the transmission operation control unit 192. In addition, the transmission control portion 19 includes a road surface detection unit 193, a wear detection unit 194, a vehicle speed estimation unit 195, and an air pressure estimation unit 196.

The road surface detection unit 193 detects whether the road surface is not suitable for estimating the road surface condition. This type of road may include a gravel road that has unevenness greater than unevenness of the reference road surface such as an asphalt road. When detecting that the vehicle travels on this type of road, the road surface detection unit 193 transmits the detection result to the transmission operation control unit 192. When the vehicle travels on the road surface that has unevenness greater than unevenness of the reference road surface, in the output voltage waveform shown in FIG. 3, the vibration of the low frequency component in a part out of the contact section takes a large value. The road surface detection unit 193 detects that the vehicle travels on the road surface that has unevenness greater than unevenness of the reference road surface based on the magnitude of the vibration of the low frequency component in the part out of the contact section shown in the output voltage waveform of the vibration power generation element 11. The road surface detection unit 193 transmits the detection result to the transmission operation control unit 192.

The wear detection unit 194 detects whether the tire 3 is worn. When detecting that the tire 3 is worn as much as the tire 3 is not suitable for estimating the road surface condition, the wear detection unit 194 notifies the transmission operation control unit 192 of the detection result. For example, the wear of the tire 3 corresponds to the usage amount of the tire 3. The wear detection unit 194 counts the cumulative rotation number of the tire 3, and calculates the wear amount of the tire 3 based on the count number. When the wear amount exceeds a predetermined threshold value, the wear detection unit 194 detects that the tire 3 is worn as much as the tire 3 is not suitable for estimating the road surface condition. For example, the number of times of extracting the contact section by the section extraction portion 17 corresponds to the number of rotations of the tire. With this configuration, the wear detection unit 194 counts the rotation number of the tire 3 by accumulating the number of times of extraction. Alternatively, the wear detection unit 194 counts the cumulative rotation number of the tire 3 each time the section extraction portion 17 detects a peak value of the detection signal of the vibration power generation element 11, that is, the first peak value or the second peak value.

The vehicle speed estimation unit 195 detects the vehicle speed. When detecting that the vehicle speed is not suitable for estimating the road surface condition or the vehicle is assumed that the estimation of the road surface condition is not necessary, the vehicle speed estimation unit 195 notifies the transmission operation control unit 192 of the detection result. For example, the road surface condition such as road surface μ is employed for the vehicle motion control such as the autonomous brake control. The vehicle motion control may be executed when the vehicle speed is within a predetermined vehicle speed range and may not be executed when the vehicle speed is out of the vehicle speed range. When the vehicle speed is high, the one rotation time interval becomes short. In such a case, the data transmission repeated in a short time period may increase in power consumption. Thus, when the vehicle speed detected by the vehicle speed estimation unit 195 exceeds the predetermined vehicle speed, the vehicle speed estimation unit 195 notifies the transmission operation control unit 192 of the detection result.

The air pressure estimation unit 196 detects the air pressure of the tire 3. When detecting that the air pressure of the tire 3 indicates an abnormal value, which is not suitable for estimating the road surface condition, the air pressure estimation unit 196 notifies the transmission operation control unit 192 of the detection result. For example, as shown in FIG. 8, by providing a pressure sensor 197 in the tire side device 1, the air pressure of the tire 3 can be detected. When the air pressure of the tire 3 is out of the normal range, the output voltage waveform shown in FIG. 3 is affected. In this case, the estimation of the road surface condition cannot be accurately executed, and there is a possibility that an estimation result of the road surface condition may include error. When the vehicle motion control is executed based on such erroneous road surface condition, there is a possibility that the control start time point is erroneously determined. Thus, when detecting that the air pressure of the tire 3 indicates the abnormal value, which is out of the normal range, for example, detecting that the air pressure is lower than the normal range, the air pressure estimation unit 196 notifies the transmission operation control unit 192 of the detection result.

As described above, in the present disclosure, the results obtained from the road surface detection unit 193, the wear detection unit 194, the vehicle speed estimation unit 195, and the air pressure estimation unit 196 in addition to the acceleration and deceleration estimation unit 191 are transmitted to the transmission operation control unit 192. Then, the transmission operation control unit 192 determines whether to stop the data transmission based on the received results. When determining to stop the data transmission, the transmission operation control unit 192 transmits the command signal that commands to stop transmitting the data to the transmitter 14.

Figure 9:
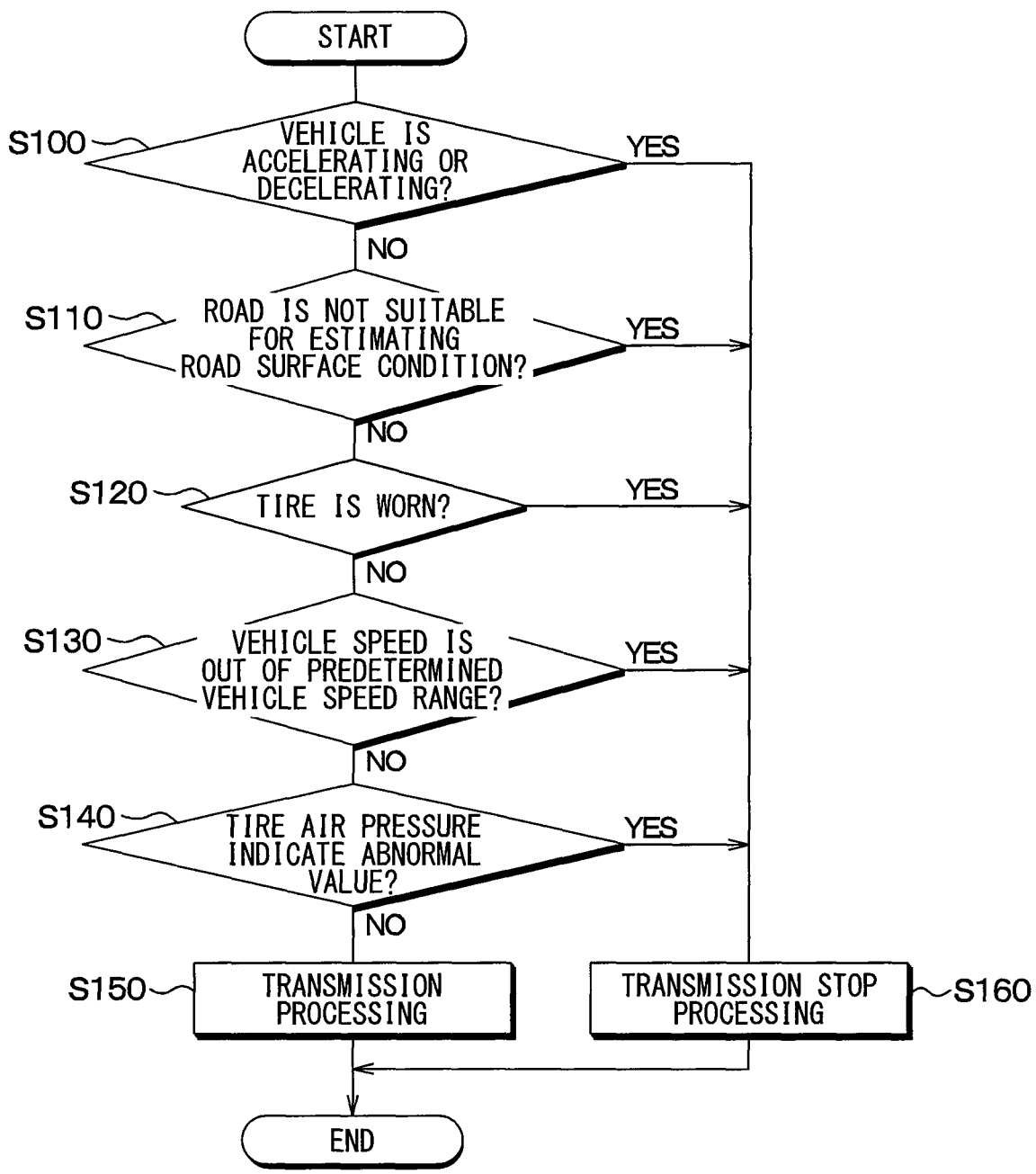
FIG. 9 is a flowchart showing details of a stop determination processing executed by a transmission control portion.

Specifically, the transmission operation control unit 192 executes the stop determination processing shown in FIG. 9. In S100, the transmission operation control unit 192 determines whether the vehicle accelerates or decelerates based on the result transmitted from the acceleration and deceleration estimation unit 191. In S110, the transmission operation control unit 192 determines whether the vehicle travels on the road that is not suitable for estimating the road surface condition based on the result transmitted from the road surface detection unit 193. In S120, the transmission operation control unit 192 determines whether the tire 3 is worn based on the result transmitted from the wear detection unit 194. In S130, the transmission operation control unit 192 determines whether the vehicle speed is out of the predetermined vehicle speed range based on the result transmitted from the vehicle speed estimation unit 195. In S140, the transmission operation control unit 192 determines whether the air pressure of the tire 3 indicates the abnormal value based on the result transmitted from the air pressure estimation unit 196. When a negative determination is made in each of S100 to S140, the procedure proceeds to S150 and the transmission operation control unit 192 executes transmission processing. When a positive determination is made in at least one of S100 to S140, the procedure proceeds to S160 and the transmission operation control unit 192 executes transmission stop processing. In the transmission processing, the transmission operation control unit 192 does not transmit the command that stops the data transmission to the transmitter 14, or transmits the command that normally executes the data transmission to the transmitter 14. In the transmission stop processing, the transmission operation control unit 192 transmit the command that stops the data transmission to the transmitter 14.

As described above, the transmission operation control unit 192 determines whether to stop the data transmission based on each of the received results. The road surface condition may be capable of being estimated in the vehicle side device 2, the data obtained by the tire side device 1 may be not suitable for estimating the road surface condition, or the estimation of the road surface condition may be not necessary. In this case, the transmission operation control unit 192 causes the transmitter 14 to stop transmitting the data.

With this configuration, it is possible to reduce electric power required for the data transmission and to prevent an increase in the size of power source of the tire side device 1.

Other Embodiments

Although the present disclosure is made based on the embodiments described above, the present disclosure is not limited to such embodiments but includes various changes and modifications which are within equivalent ranges. In addition, while various combinations and configurations, which are preferred, other combinations and configurations including further only a single element, more or less, are also within the spirit and scope of the present disclosure.

(1) For example, in the above-described embodiment, the vehicle side device 2 estimates the road surface condition by comparing the integrated voltage transmitted from the tire side device 1 with the constant determination threshold value. Alternatively, the threshold value may be variable.

For example, the vibration occurring in the tire 3 is changed corresponding to the vehicle speed. The vibration occurring in the tire 3 becomes greater with an increase of the vehicle speed even in the same road surface condition. In this configuration, the high frequency component included in the detection signal of the vibration power generation element 11 becomes greater and the integrated voltage charged in the capacitor 183*a* becomes larger with the increase of the vehicle speed. Thus, for example, the vehicle speed data are transmitted to the situation estimation portion 22, and the determination threshold value may be changed to a larger value with the increase of the vehicle speed indicated in the vehicle data. For example, the vehicle speed data may be calculated by the vehicle ECU based on the detection signal of the vehicle speed sensor or the wheel speed sensor and the situation estimation portion 22 may obtain the vehicle speed data via CAN communication.

(2) In the above-described embodiment, the integrated voltage, in which the high frequency component of the vibration power generation element 11 is integrated, is employed as the value indicative of the road surface condition. Alternatively, a value of the level of the high frequency component corresponding to the contact section such as an average value or a maximum value may be employed as the value indicative of the road surface condition.

(3) In the above-described embodiment, the pulse detection unit 171 extracts the high frequency component of the vibration power generation element 11 from the contact start time point to the contact end time point of the vibration power generation element 11, that is, in the contact time interval. The capacitor 183*a* is charged with the high frequency component so as to obtain the integrated voltage. The above-described embodiment shows an example of the charging time for obtaining the integrated voltage. Alternatively, the charging time for obtaining the integrated voltage may be defined for a certain period from the contact start time point of the vibration power generation element 11. For example, the time assumed as the contact time interval of the vibration power generation element 11 when the vehicle travels at a speed of 60 km/h may be defined as the charging time. In that case, when the vehicle travels at a speed of more than 60 km/h, there is a time period in which the vibration power generation element 11 is out of the contact section in the charging time. The high frequency component of the detection signal of the vibration power generation element 11 charges the capacitor 183*a* in the time period. Thus, the vehicle speed data may be input. In this case, when the input vehicle speed exceeds a vehicle speed corresponding to the assumed charging time, that is, the assumed contact time interval, the road surface condition estimation may not be executed.

(4) In the above-described embodiment, the road surface condition data is transmitted from the tire side device 1 to the vehicle side device 2 each time the tire 3 makes one rotation. Alternatively, the road surface condition data may be transmitted each time the tire 3 makes multiple rotations. In this case, power consumption can be reduced compared with the case where the data is transmitted each time the tire 3 makes one rotation. Even in such a case, data transmission may be limited to a time when it is necessary. Thus, it is assumed that the road surface condition cannot be accurately estimated when the data are transmitted each time the tire 3 makes multiple rotations. In this case, data transmission is stopped in the manner described above, so that the similar advantages to the above-described embodiment can be obtained.

(5) Further, in the above-described embodiment, examples of the transmission stop condition for stopping the transmission of the road surface condition data by the signal processing circuit 13 is described. Specifically, the transmission stop condition includes the case where the vehicle travels on the road surface that has unevenness greater than unevenness of the reference road surface, the case where the tire 3 is wore, the case where the vehicle speed is out of the predetermined speed range, and the air pressure of the tire 3 indicates the abnormal value in addition to the case where the vehicle accelerates or decelerates. Another transmission stop condition may be employed, and when the transmission stop condition is satisfied, the transmission of the road surface condition data is stopped. One transmission stop condition may be set. Alternatively, multiple transmission stop conditions may be set. It is assumed that the multiple transmission stop conditions are set. In this case, when at least one of the multiple transmission stop conditions are satisfied, the transmission of the road surface condition data is stopped.

The invention claimed is:

1. A road surface condition estimation apparatus comprising:
a tire side device including:
a vibration detection element being attached to a back surface of a tread of a tire, which is attached to a vehicle, and being configured to output a detection signal corresponding to a magnitude of a vibration of the tire;
a tire side processor being configured to:
extract a contact section during one rotation of the tire, the contact section is defined that a section of the tread corresponding to the vibration detection portion attached to the tire contacts a road; and
calculate a level of high frequency component of the detection signal corresponding to the contact section; and
a transmitter being configured to transmit a calculation result of the level of high frequency component as road surface condition data indicative of a condition of road surface on which the vehicle travels each time the tire rotates for a predetermined number of times; and
a vehicle side device including:
a receiver being configured to receive the road surface condition data transmitted from the transmitter; and
a vehicle side processor being configured to estimate the condition of road surface,
wherein
the tire side processor is further configured to:
estimate whether the vehicle accelerates or decelerates based on the detection signal; and
stop the transmitter from transmitting the road surface condition data when the tire side processor estimates that the vehicle accelerates or decelerates.

2. The road surface condition estimation apparatus according to claim 1, wherein
the tire side processor is further configured to:
estimate a contact time interval based on the detection signal, the contact time interval being defined as an interval in which the section of the tread corresponding to the vibration detection element attached to the tire contacts the road;
calculate a change of the contact time interval each time the tire makes one rotation; and
estimate whether the vehicle accelerates or decelerates based on the change of the contact time interval.

3. The road surface condition estimation apparatus according to claim 1, wherein
the tire side processor is further configured to:
estimate an one rotation time interval based on the detection signal, the one rotation time interval being defined as an interval in which the tire makes one rotation;
calculate a change of the one rotation time interval each time the tire makes one rotation; and
estimate whether the vehicle accelerates or decelerates based on the change of the one rotation time interval.

4. The road surface condition estimation apparatus according to claim 1, wherein
the tire side processor is further configured to:
detect whether an unevenness of the road on which the vehicle travels is greater than an unevenness of reference road; and
stop the transmitter from transmitting the road surface condition data when the tire side processor detects that the unevenness of the road on which the vehicle travels is greater than the unevenness of reference road.

5. The road surface condition estimation apparatus according to claim 1, wherein
the tire side processor is further configured to:
detect whether the tire is worn; and
stop the transmitter from transmitting the road surface condition data when the tire side processor detects that the tire is worn.

6. The road surface condition estimation apparatus according to claim 1, wherein
the tire side processor is further configured to:
estimate a vehicle speed of the vehicle and detect whether the vehicle speed is out of a predetermined vehicle speed range; and
stop the transmitter from transmitting the road surface condition data when the tire side processor detects that the vehicle speed is out of the predetermined vehicle speed range.

7. The road surface condition estimation apparatus according to claim 1, wherein
the tire side processor is further configured to:
detect a tire air pressure and detect whether the tire air pressure indicates an abnormal value; and
stop the transmitter from transmitting the road surface condition data when the tire side processor detects that the tire air pressure indicates the abnormal value.

8. A road surface condition estimation apparatus comprising:
a tire side device including:
a vibration detection portion being attached to a back surface of a tread of a tire, which is attached to a vehicle, and being configured to output a detection signal corresponding to a magnitude of a vibration of the tire;
a signal processing portion including:
a section extraction portion being configured to extract a contact section during one rotation of the tire, the contact section is defined that a section of the tread corresponding the vibration detection portion attached to the tire contacts a road; and
a level calculation portion being configured to calculate a level of high frequency component of the detection signal corresponding to the contact section; and
a transmitter being configured to transmit a calculation result of the level of high frequency component as road surface condition data indicative of a condition of road surface on which the vehicle travels each time the tire rotates for a predetermined number of times; and
a vehicle side device including:
a receiver being configured to receive the road surface condition data transmitted from the transmitter; and
a road surface condition estimation portion being configured to estimate the condition of road surface,
wherein
the signal processing portion includes:
an acceleration and deceleration estimation unit being configured to estimate whether the vehicle accelerates or decelerates based on the detection signal of the vibration detection portion; and
a transmission operation control unit being configured to stop the transmitter from transmitting the road surface condition data when the acceleration and deceleration estimation unit estimates that the vehicle accelerates or decelerates.

* * * * *